United States Patent [19]

Neumeyer et al.

[11] 4,292,871
[45] Oct. 6, 1981

[54] WELDED EDGE BAND SAW TOOTH GEOMETRY

[75] Inventors: Tom A. Neumeyer; Francis W. Foster, both of Athol, Mass.

[73] Assignee: The L. S. Starrett Company, Athol, Mass.

[21] Appl. No.: 8,755

[22] Filed: Feb. 1, 1979

[51] Int. Cl.³ .................... B27B 33/02; B23D 61/12
[52] U.S. Cl. .................................. 83/661; 83/835; 76/112
[58] Field of Search .............. 83/661, 835, 854, 855; 76/112

[56] References Cited

U.S. PATENT DOCUMENTS

| | | | |
|---|---|---|---|
| 3,072,164 | 1/1963 | Ramirez et al. | 83/661 |
| 3,110,952 | 11/1963 | Anderson | 83/661 |
| 3,295,400 | 1/1967 | Anderson | 83/661 |
| 3,315,548 | 4/1967 | Anderson et al. | 76/112 |
| 3,651,841 | 3/1972 | Ohlsson | 83/835 X |
| 3,712,348 | 1/1973 | Kulik et al. | 83/835 |

Primary Examiner—Donald R. Schran
Attorney, Agent, or Firm—Kenway & Jenney

[57] ABSTRACT

A new tooth form for a welded edge band saw, which has a positive rake angle and an enlarged gullet space, while maintaining a large wedge angle, is disclosed. The tooth geometry has a wedge angle greater than positive rake tooth forms of previous design and a gullet space comparable to a zero rake angle standard tooth form. The new tooth form provides an improved cutting rate and useful life and it is particularly advantageous in connection with high speed heavy duty band saw apparatus.

10 Claims, 3 Drawing Figures

WELDED EDGE BAND SAW TOOTH GEOMETRY

BACKGROUND OF THE INVENTION

The invention relates generally to cutting apparatus and in particular to an improved tooth geometry in a welded edge band saw blade.

The terms used to describe the geometry of a saw blade tooth, for example the rake angle, the wedge angle, the relief angle, etc., are defined in International Standard ISO 4875/1-1978. The terms used herein to define tooth geometry are in accordance with the definitions in ISO 4875/1-1978.

For most of the past fifty years, the geometry of a band saw blade tooth has remained substantially unchanged. And during the past fifty years it has become well known that a good tooth geometry requires a tradeoff between many conflicting parameters. In particular, a tooth should have a large mass for strength and to conduct heat away from the cutting edge or tooth tip. This corresponds to a large wedge angle and a small relief angle. A large wedge angle and small relief angle also give the tooth greater resistance to shock and vibration, and in the case of a welded edge band saw blade, a greater resistance to stripping or shearing.

Yet at the same time, the relief angle should be maintained as large as possible so that the wear properties of the tooth are not substantially diminished. Wear in connection with a blade tooth is denoted by a flat which replaces the originally sharp tooth tip as the blade is used. As the flat increases in area, the force applied to the blade to maintain the same pressure on the workpiece must be correspondingly increased.

In the welded edge band saw blade wherein a tooth tip portion of a high hardness, high strength material is welded to a band base of a strong, flexible material, there is, in addition, the requirement that the welds between the tips and the rest of the blade be strong and hence have a significant linear length. This is particularly important because these band saw blades operate at high cutting speeds utilized in today's high speed, heavy duty, band saw cutting equipment. The desired result in this context is a welded edge band saw blade in which the area of the weld for each tooth is as great as possible. And this requirement is generally satisfied by a tooth geometry having a large mass which, as noted above, also e.g., removes substantial heat from the cutting surface.

The rake angle of the earlier saw blades including band saw blades was generally zero degrees. This is typically called a regular or standard tooth geometry, i.e. a tooth which has a rake angle of zero degrees and a full rounded gullet. It has also become well known that a second configuration of tooth geometry, having a positive rake angle, reduces the cutting stress and generally provides an increased cutting rate. This is the hook tooth form. However the reduction in cutting stress was heretofore available only at the expense of tooth mass. Thus, in the regular tooth, the wedge angle was typically about 54° or 55° and the relief angle was typically 35° or 36°. When a positive rake angle was introduced, it was primarily at the expense of the wedge angle, it also being well known that the minimum acceptable relief angle was substantially 30°. Thus, in a well designed hook tooth, the positive rake angle was typically 5°–10°, the wedge angle was 50°–51°, and the relief angle was greater than or equal to 30°. As a result, in a hook tooth the mass of the cutting tooth was reduced and hence the heat conduction and strength properties of the tooth were also reduced. Nevertheless, however, the hook tooth design is advantageous, particularly in work hardening metals, and has been successfully used by many manufacturers.

The requirement of an at least minimum relief angle of 30° alluded to above in the hook tooth geometry, meets the minimum requirement for gullet area to remove the chips as they are being formed in a cutting operation. If the gullet area were too small, the tooth, as it cuts through a workpiece, could pack the gullet area with chips; and if the gullet area became packed prior to exiting the workpiece, the chip material within the gullet either would force the blade away from the workpiece or would require additional force to maintain the blade in contact with the workpiece. In addition, depending upon the chip configuration, increased loading, and even binding, of the blade can occur. Therefore in high speed, heavy duty band sawing, an adequate gullet area is a necessary requirement.

The geometry of prior saw teeth further makes it clear that the gullet space, for high speed cutting applications, not only must be large in order to accommodate a generous filling of chip material but should also be configured to allow that chip material to be easily removed from the gullet as the tooth exits from the workpiece. For this reason, the gullet bottom of a standard tooth has a generally well rounded, relatively large space so that the chip materials contained therein will fall away with relative ease. Even so, however, in those instances wherein the chip material either breaks or forms a tightly wound spiral configuration while being removed from the workpiece, the chip material may form a cylinder of sufficient diameter to engage the entire circular bottom of the gullet space. Thus, designers have provided not only large gullet spaces but a gullet space having a large radius bottom shape. The large area gullet tends to dictate, in prior tooth geometries, the relatively large relief angle and where a positive rake angle is employed, a concomitant smaller wedge angle.

Despite the availability of known and useful, commercially accepted standard tooth geometries, various applications require special blade tooth geometries in order to meet their operating specifications. Thus, in the early 1940's, it was suggested that the regular tooth geometry be modified after hardening by grinding the tooth tip at a primary relief angle of 15°–20°. (See for example Stevens U.S. Pat. No. 2,431,517). In Stevens, a "regular tooth" is purposely cut back at its tip so that the primary relief angle, that is, the relief angle at the tip of the tooth, is between about 15° and 20° and a secondary relief angle, that is, the original relief angle of the tooth before being cut back, is about 36°. Stevens claims in U.S. Pat. No. 2,431,517 that the reduced primary relief angle provides outstandingly improved qualities both from the standpoint of useful life and cutting speed. The Stevens blade however, because the relief angle is between 15° and 20°, would result in significantly shortened life for a band saw blade.

Another application employing a shallow first relief angle is disclosed in Cowley, U.S. Pat. No. 3,416,579, in which the initial starting teeth of a hack saw blade each have a small first relief angle of between 7° and 18°. This small relief angle provides easy starting on thin materials but is not adapted to provide the advantages of the present invention. The Cowley teeth are otherwise "regular teeth" insofar as they have a zero degree rake angle.

It is therefore an object of the invention to provide an improved tooth geometry for a welded edge band saw blade which has a positive rake angle and increased tooth mass, while maintaining a large, gullet space. Other objects of the invention are a strong tooth tip configuration and a large heat transfer tooth mass, which lead to a high cutting rate and long life. Yet a further object of the invention is a gullet space configuration which provides good chip removal. Further objects of the invention are a tooth geometry which can be easily manufactured, which maintains a high cutting rate and a low cutting stress associated with positive rake angle tooth geometries, which maintains concurrently a large gullet area for heavy duty applications, and which provides a long weld line for high shearing strength and reliability.

SUMMARY OF THE INVENTION

The invention thus relates to a welded edge band saw blade having a tooth structure wherein each tooth has a tip portion of a high hardness, high strength material welded to a band base of a strong, flexible material, at least some of the teeth have a positive rake angle, and the teeth are separated by gullet spaces. The invention features a welded edge band saw blade wherein at least some of the teeth with the positive rake angle have a first relief surface with a first relief angle of between about 25° and 31° and an associated gullet space, which extends in part beneath a reference line extending from a tooth apex at the first relief angle.

In other aspects of the invention, the positive rake angle is between about 4° and 7° with the relief angle being between about 25° and 31°. Further, in yet another aspect of the invention, the first relief angle is between about 25° and 31° while a wedge angle is between 53° and 61°.

The welded edge band saw blade, in another aspect of the invention, features a substantially large area gullet having a depth, D, of between 0.46"/X and 0.56"/X, where X is the number of the teeth per inch for the blade; a primary gullet surface and a secondary gullet surface, the primary and secondary surfaces each having a radius between 0.38D and 0.48D, and wherein the gullet further features a flat bottom surface portion connecting the primary and secondary surfaces, the flat portion being substantially parallel to the band saw teeth apices and having a length at least equal to 0.1"/X.

In preferred embodiments of the invention, the tooth geometry has a wedge angle of 55°.

DESCRIPTION OF THE DRAWINGS

Other objects, features, and advantages of the invention will become apparent from the following description of preferred embodiments of the invention taken together with the drawings, in which.

DESCRIPTION OF PREFERRED EMBODIMENTS OF THE INVENTION

Figure 1:
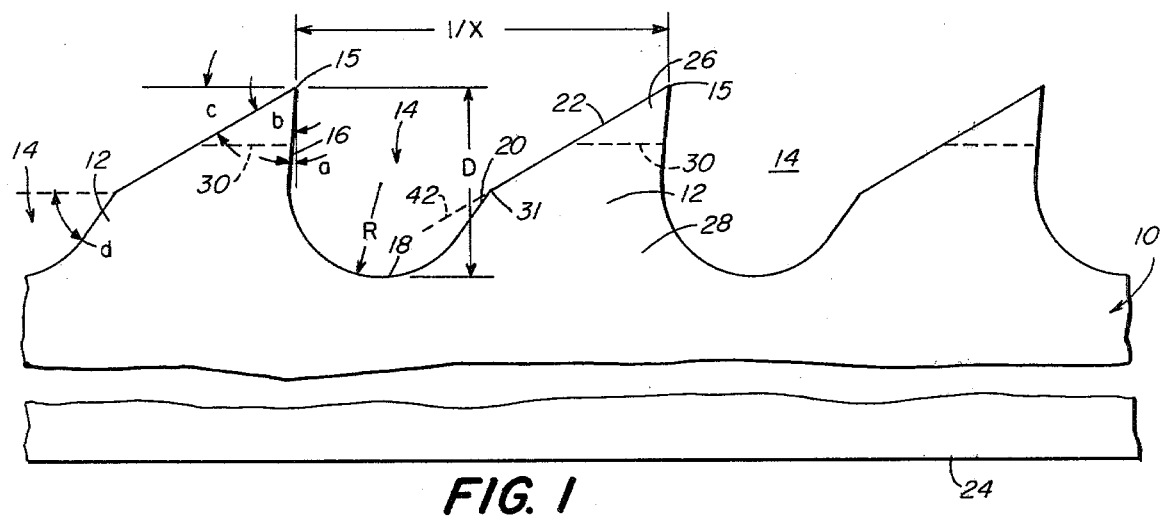
FIG. 1 is an elevation view of a saw tooth geometry according to a first embodiment of the invention.

Referring to FIG. 1, a welded edge band saw blade 10 has a plurality of teeth 12 separated by gullet spaces 14. Each saw blade is characterized by the number teeth per inch "X", which is the reciprocal of the distance (in inches) between corresponding apices 15 on two successive teeth. Each tooth in the illustrated embodiment has a positive rake angle, "a", a substantially large wedge angle "b", and a primary or first relief angle "c".

In the embodiment illustrated in FIG. 1, the gullet space 14 is defined by a face 16, a curvilinear bottom surface portion 18, a rectilinear secondary relief surface 20, and a primary relief surface 22. The angles "c" and "d" which the primary and secondary relief surfaces, respectively, make with an axis passing through the apices 15 (and generally parallel to a back edge 24 of the band saw blade) are designated the primary relief angle (noted above) and secondary relief angle, respectively. The primary relief angle and the rake angle together define the wedge angle "b" for each tooth.

Each tooth of the welded edge band saw blade 10 has a tip portion 26 welded, preferably electron beam welded, to a band base 28 along a weld 30. The length of the weld determines substantially the shearing strength of attachment between each tip 26 and band base 28.

According to preferred positive-rake-angle embodiments of the invention, and unlike the available designs in the prior art, the gullet space and the wedge angle are advantageously configured with a large area and a large angle, respectively. To accomplish this, in the illustrated FIG. 1 embodiment, the initial primary relief surface 22 has an angular break at 31 to provide the secondary relief surface 20, so that the wedge angle (and hence weld 30), and the gullet space are each of an adequate dimension. While this represents a compromise between two opposing considerations (tooth mass vs. gullet size), a positive-rake-angle tooth having increased mass and strength, large gullet space, and an increased cutting rate, results by choosing the tooth parameters according to the specific geometric structure provided herein.

Thus, according to the illustrated embodiment of the invention, the rake angle "a" can be between about 4° and 10°, preferably between 4° and 7°, and more preferably still between 5° and 7°. In the illustrated embodiments herein, the rake angle is 5°. The wedge angle "b" is preferably between 53°–61°, more preferably between 55°–60°, and in the preferred embodiment is 55°. The primary relief angle "c" is preferably between 25° and 31°, more preferably between 28° and 30°, and in the illustrated embodiment is 30°.

Having defined the tip portion 26 of the tooth by its rake, wedge, and primary relief angles, the dimensions of the gullet space will complete the specification of the tooth geometry. In FIG. 1, the radius "R" of the gullet bottom surface, the gullet depth D, and the secondary relief angle "d" of secondary surface 20, completely specify the gullet space, and hence complete the definition of the tooth geometry. According to the illustrated embodiment of the invention the secondary relief angle can be between 50° and 60°, and in the illustrated embodiment is 55°. The gullet depth "D" is equal approximately to 0.54"/X where X is the number of teeth per inch of the blade. The radius "R" of the curvilinear gullet bottom surface is, in this illustrated embodiment of the invention, equal approximately to one half of the gullet depth "D" and equals, in this embodiment of the invention, approximately 0.27"/X. The design criteria enumerated above provide, for the first time, a positive-rake-angle tooth having improved heat conduction and strength characteristics in combination with a large area gullet. As is well known in the art, previous positive-rake-angle tooth geometries do not have available the range of wedge angles described herein in combination with the large area gullet, and thus do not have the capability of the cutting blade of the preferred embodiments of the invention.

Figure 2:
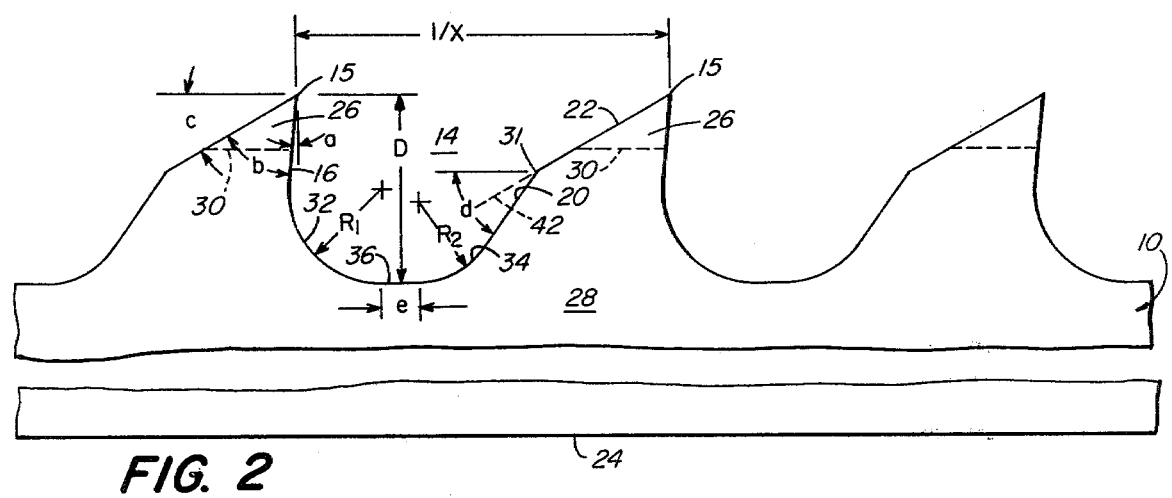
FIG. 2 is an elevation view of a saw tooth geometry according to a second embodiment of the invention.

Referring now to FIG. 2, in an alternate, preferred embodiment of the tooth geometry according to the invention, the gullet shape is modified to provide an alternate design for clearing of chips contained therein after the gullet exits the workpiece during a cutting operation. According to this preferred embodiment of the invention, the rake angle "a", the wedge angle "b", the primary relief angle "c", and the secondary relief angle "d" have the same dimensional relationships as were described in connection with the band saw blade teeth of FIG. 1. The bottom of the gullet however is now defined by a primary gullet surface 32 of radius $R_1$, a secondary gullet surface 34 a radius $R_2$, and a substantially short flat bottom surface portion 36 of length "e" connecting the surfaces 32 and 34.

The primary and secondary surfaces 32 and 34, and the flat surface portion therebetween, ensure that a tightly coiled, curled chip will be readily expelled from the gullet as the teeth pass out of the workpiece that is being cut. Thus, a coiled chip, which has grown to a maximum diameter equal to the gullet depth "D", will, according to the illustrated embodiment, be tangent to the gullet boundary surfaces at only two points, one on the face surface 16 and the other on the gullet flat 36. This allows for greater ease in clearing the coiled chips from the gullet because surface contact between the chip and the gullet surfaces has been reduced to a minimum.

On the other hand, if because of a relatively short length of cut, chips do not grow to the maximum diameter and maintain a diameter congruent with the primary gullet surface, the chips so formed are still more likely to be readily expelled from the gullet than the chips formed similarly in other tooth form gullets because the length of the arc of contact between the coiled chip surface and the gullet surface 32 is reduced according to the illustrated embodiment of FIG. 2. Thus, according to this preferred embodiment of the invention, the arc of contract between the coiled chip surface and gullet surface is preferably between 94° and 100° while in, for example, a regular tooth structure the arc of contact is approximately 125°.

In order to preserve all of the chip-clearing advantages of this gullet design, the primary and secondary radii must each be less than the radius of the maximum diameter curled chip, that is, less than one-half of the gullet depth. According to this preferred embodiment, the gullet depth is between 0.46"/X and 0.56"/X, where X is the number of teeth per inch for the blade. Preferably, the depth is approximately 0.52"/X. Accordingly, the primary gullet radius and the secondary gullet radius, in the preferred illustrated embodiment of the invention, are between 0.38D and 0.48D, where D is equal to the gullet depth. For a preferred depth of 0.52"/X, the preferred primary and secondary radii are 0.21"/X and 0.24"/X respectively. In order to maintain the coiled chip tangent to the gullet flat 36, the flat must be at least 0.1"/X. However, the flat could be extended if desired, for example if an extension is necessary to operate according to the invention in a constant-depth, variable pitch band saw blade.

Figure 3:
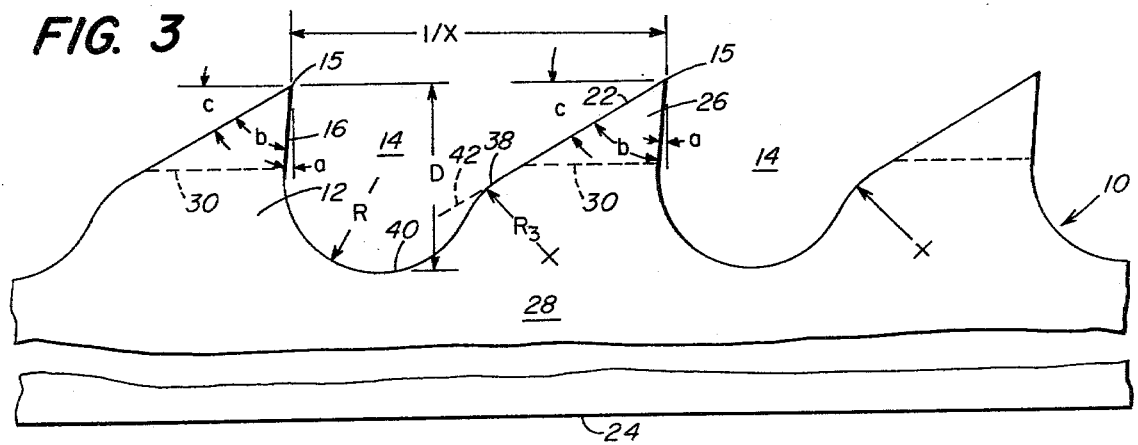
FIG. 3 is an elevation view of a saw tooth geometry according to a third embodiment of the invention.

Referring now to FIG. 3, a modification of the FIG. 1 embodiment (also applicable to the FIG. 2 embodiment), employs a curvilinear surface 38 between the primary relief surface 22 and a curvilinear bottom surface 40 of the gullet (or a rectilinear surface corresponding to the secondary relief surface, for example, surface 20 of FIG. 1). The curvilinear surface 38, in the illustrated embodiment, is a portion of a circle having a radius $R_3$ and is tangent to the primary relief surface 22 and the bottom gullet surface 40 which has the radius R. In this embodiment of the invention, as in previously described embodiments, the positive rake angle "a" is between 4° and 10°, preferably between 5° and 7°; the wedge angle "b" is between 53° and 61°, preferably 55°; and the primary relief angle "c" is between 25° and 31°, preferably 30°. The radius R preferably equals one-half the gullet depth and in this illustrated embodiment equals 0.27"/X where X is the number of teeth per inch for the blade.

There results according to the present invention a welded edge band saw tooth geometry having a superior cutting rate with high resistance to shearing forces and excellent life wear characteristics. The following data support this conclusion. The high strength of the new tooth form, corresponding to the shearing strength, or stripping resistance, is proportional to the weld length, and can be calculated using the formula $$W = H(\cot c - \tan a) = H \cdot S$$

where "W" is the weld length and "H" is the height of the blade tip, i.e. the distance from the weld line to the tooth apex. For a regular standard tooth having a zero degree rake angle and a 36° primary relief angle, the factor in parenthesis, "S", the strength factor, equals 1.376. For a standard hook tooth having a 10° rake angle and a 30° primary relief angle the strength factor is 1.556. For the tooth geometry described herein having a 5° rake angle and a 30° primary relief angle the strength factor is 1.645 and where the rake angle is 7° and the primary relief angle is 28°, the strength factor is 1.758. Thus for both a 5° and a 7° rake angle, according to the invention, a greater shearing strength or stripping resistance is obtained.

The new tooth geometry has been described in connection with a constant pitch saw blade. The new tooth form is also equally suitable for variable pitch and/or variable gullet depth blades.

Thus, the tooth geometry according to the invention requires a positive rake angle in a saw tooth blade wherein the gullet space extends in part beneath a reference line 42 passing through a tooth apex at the primary relief angle. This differs from other positive rake angle tooth forms which generally follow the standard hook tooth form, with or without the rounded gullet, and wherein the reference line, at the primary relief angle, does not intersect the gullet area but always passes along or beneath the gullet space boundary.

The tooth geometry according to the invention thus provides advantages with respect to gullet size, tooth mass, and welded edge shear strength which are unavailable in other positive rake angle saw tooth configurations. The tooth geometry therefore advantageously provides a large gullet space while maintaining a small relief angle and hence significant tooth mass. The tooth geometry according to the invention thus advantageously increases shear strength, lessening the risk of tooth stripping in heavy load applications; and increases tooth mass in back of the cutting edge, thereby (a) increasing resistance to shock and vibration that can lead to tooth chipping, and (b) providing increased heat dissipation compared to other high performance positive-rake-angle saw blades. The tooth geometry according to the invention also concurrently provides deep, chipcurling gullets which expel the chips more easily than those of conventional teeth.

Other embodiments of the invention including additions, subtractions, deletions, and other modifications of the described preferred embodiment will be obvious to one practiced in the skill of the art and are within the scope of the following claims.

We claim:

1. In a welded edge band saw blade for high speed, heavy duty cutting, said blade having a tooth structure wherein
   each tooth has a substantially triangularly-shaped tip portion of a high hardness, high strength material welded along a plane parallel to the direction of blade movement to a band base of strong, flexible material, and
   at least some of said teeth have a positive rake angle, the improvement wherein at least some of said teeth with said positive rake angle have
   a rake angle of between about 4° and 7°,
   a wedge angle between about 53° and 61°,
   a first relief surface having a first relief angle between about 25° and 31°, said first relief surface lying in a plane substantially normal to lateral sides of said tip portion, and
   a second relief angle of between about 50° and 60° defining in part an associated gullet space which extends in part beneath a reference line extending from a tooth apex at said first relief angle, said gullet space having a configuration for promoting the formation of a curled chip in said gullet during metal cutting.

2. The welded edge band saw blade of claim 1 wherein said second relief angle is about 55°.

3. The welded edge band saw blade of claim 1 wherein said improvement further comprises a substantially large area gullet having a bottom cut-out surface portion defining a gullet depth, said bottom portion having a radius equal to about one-half the gullet depth.

4. The welded edge band saw blade of claim 3 wherein the radius equals about 0.27" divided by the number of teeth per inch for the blade.

5. The welded edge band saw blade of claim 1 wherein said improvement further comprises
   a substantially large area gullet having
   a depth D of between 0.46"/X and 0.56"/X, where X is the number of teeth per inch for the blade,
   a primary gullet surface and a secondary gullet surface, said primary and secondary surfaces each having a radius between 0.38D and 0.48D, and
   a bottom flat surface portion connecting said primary and secondary surfaces, said flat portion being substantially parallel to an axis defined by the band saw teeth apices and having a length at least equal to 0.1"/X.

6. The welded edge band saw blade of claim 1 wherein said wedge angle is about 55°.

7. The welded edge band saw blade of claim 6 wherein said first relief angle is about 30°.

8. In a welded edge band saw blade for high speed, heavy duty cutting, said blade having a tooth structure wherein
   each tooth has a substantially triangularly-shaped tip portion of a high hardness, high strength material welded along a plane parallel to the direction of blade movement to a band base of a strong, flexible material, and
   said teeth are separated by a gullet portion,
   the improvement comprising
   said gullet portion having
   a depth D of between 0.46"/X and 0.56"/X, where X is the number of teeth per inch for the blade,
   a primary gullet surface and a secondary gullet surface, said primary and secondary surfaces each having a radius between 0.38D and 0.48D, and
   a flat bottom surface portion connecting said primary and secondary surfaces, said flat portion being substantially parallel to an axis defined by the band saw teeth apices and having a length at least equal to 0.1"/X,
   said gullet portion extending in part beneath a reference line extending from a tooth apex at a first relief angle, said gullet portion having a configuration for promoting the formation of a curled chip in said gullet during metal cutting.

9. The welded edge band saw blade of claim 8 wherein said primary radius is smaller than said secondary radius.

10. The welded edge band saw blade of claim 8 wherein
    said first relief angle is between about 25° and 31°, and said teeth further having
    a wedge angle between about 53° and 61°, and
    a second relief angle of between about 50° and 60°.

* * * * *